July 29, 1969
D. W. CHANEY
3,458,213
MULTIPLE AXLE SYSTEM FOR VEHICLES
Filed May 18, 1967
4 Sheets-Sheet 1
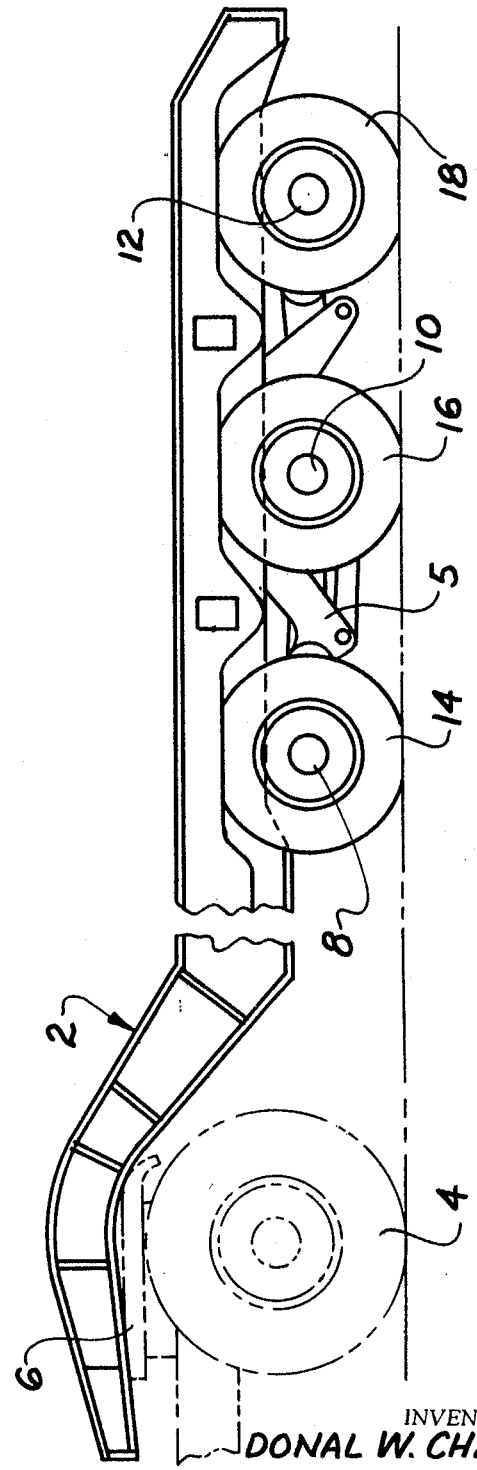
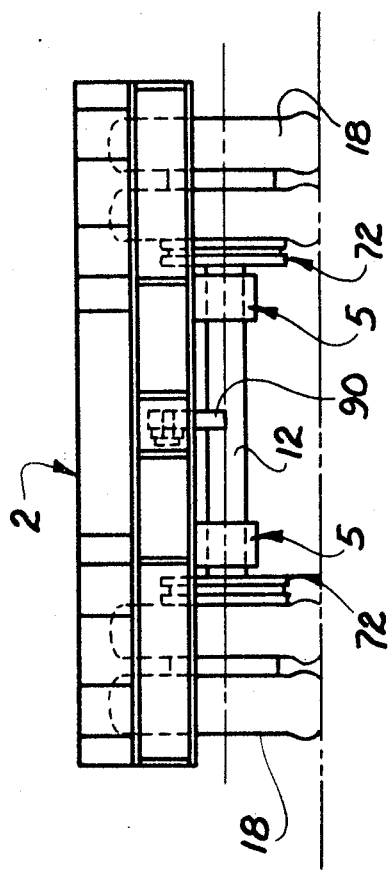
INVENTOR.
DONAL W. CHANEY
BY
*Schmieding & Fultz*
ATTORNEYS

INVENTOR.
DONAL W. CHANEY

July 29, 1969  D. W. CHANEY  3,458,213
MULTIPLE AXLE SYSTEM FOR VEHICLES
Filed May 18, 1967  4 Sheets-Sheet 3
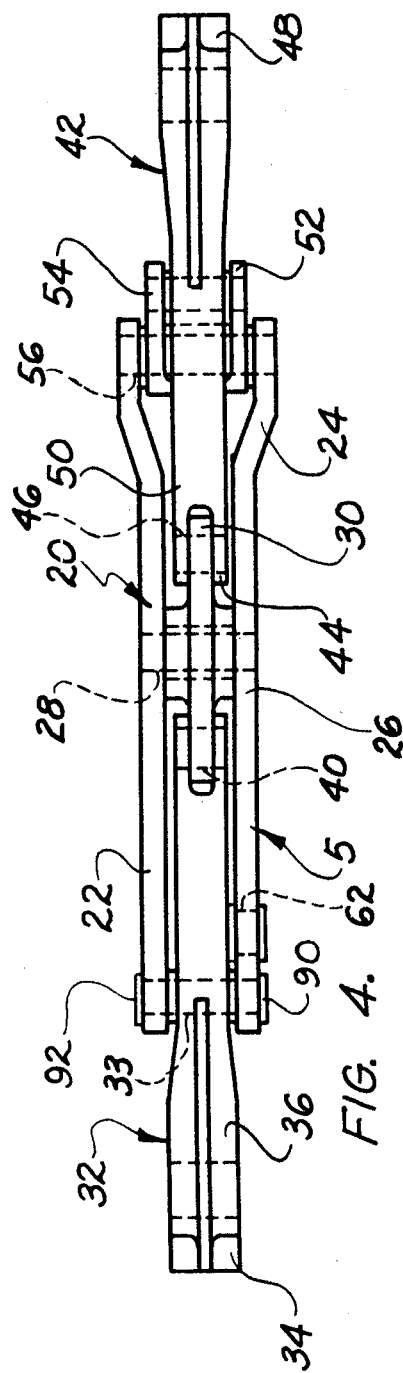
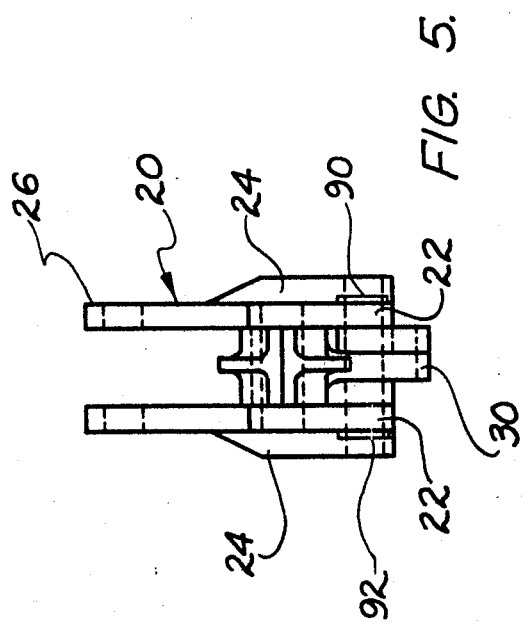
INVENTOR.
DONAL W. CHANEY
BY
*Schmieding & Fults*
ATTORNEYS

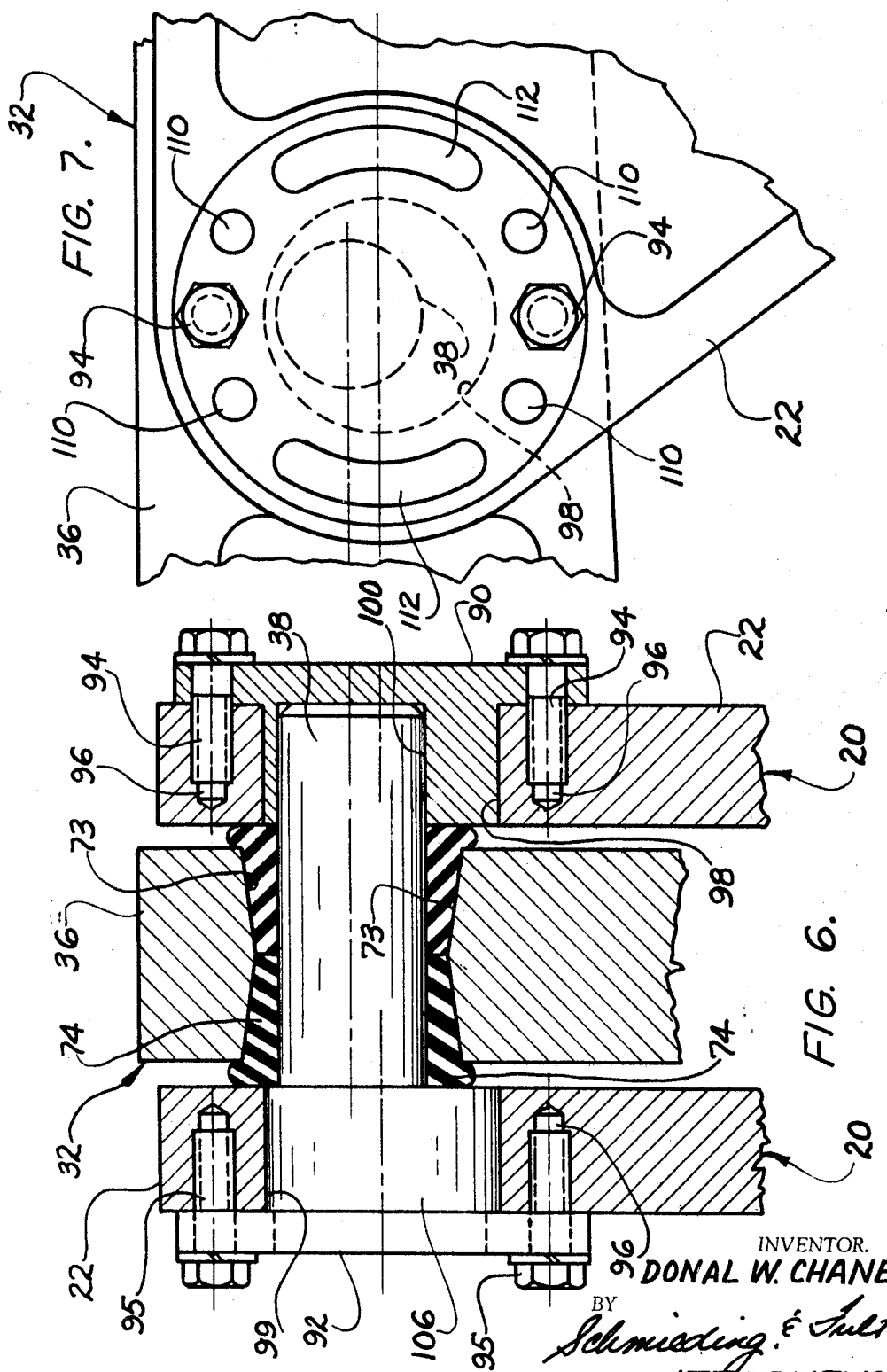

United States Patent Office 3,458,213
Patented July 29, 1969

3,458,213
MULTIPLE AXLE SYSTEM FOR VEHICLES
Donal W. Chaney, Galion, Ohio, assignor to Harsco Corporation, Harrisburg, Pa., a corporation of Delaware
Filed May 18, 1967, Ser. No. 639,395
Int. Cl. B60g 11/18; F16f 1/16; B62d 53/00
U.S. Cl. 280—104.5                    8 Claims

ABSTRACT OF THE DISCLOSURE

A multiple axle suspension system of the type that utilizes a plurality of load carrying axles mounted in tandem arrangement for increasing the load carrying capacity. The suspenson system is provided with linkage means for equally distributing the load over the plurality of axles and such linkage includes means for accurately adjusting the centerline to centerline distances between the axles and other components of the suspension system.

---

The present invention relates generally to multiple axle suspension systems for vehicles and particularly to a novel means for adjusting the alignment between axles of such suspension apparatus which include an adjustable pin and boss construction having an eccentric pivot point for changing centerline to centerline distances between certain suspension linkage apparatus.

In general, the load carrying capability of large semi-trailer type vehicles has been increased by utilizing a plurality of load carying axles mounted in tandem arrangement. The axle mounting apparatus have been constructed such that the weight of the vehicle and load will be substantially equally distributed over all the axles and wheels. Such load equalizing constructions, however, have generally presented a problem in that relatively small tolerances must be met relative to the alignment distance between each axle on the multiple axle construction.

This alignment problem not only presents itself in the manufacture and assembly of the apparatus, but further, represents a constant problem during use as the vehicle encounters road depressions or obstructions as well as normal wear which tend to change the original desired alignment of the axles. From time to time, the suspension apparatus, therefore, must be checked for proper alignment and readjustments must be made in order that the suspension apparatus maintain an efficient load equalizing function.

In accordance with the present invention, the novel pin and boss construction provides simple, direct means for adjusting the critical alignment distance between multiple axle suspension apparatus within the demands of the required close tolerances.

As another aspect of the present invention, the novel pin and boss construction includes an eccentric pivot point which permits adjustment of the centerline to centerline distances between suspension linkage components by simply rotating the boss and pivot pin relative to a bore in the pivoted member through which the pin is disposed.

As another aspect of the present invention, the novel pin and boss construction utilizes fewer working parts, lessens the weight and the cost, and provides a more positive locking action as compared to prior methods and means utilized for alignment adjustments for multiple axle suspension apparatus.

As another aspect of the present invention, the novel pin and boss construction permits the use of conventional hand tools for making any necessary alignment adjustments.

It is therefore an object of the present invention to provide a novel pin and boss construction for multiple axle suspension apparatus which is relatively simple in construction and permits direct readjustment of the alignment between axles within the relatively small tolerances.

It is another object of the present invention to provide a novel pin and boss construction of the type described which utilizes an eccentric pivot point and a plurality of fastening positions to permit the realignment of the distance between axles by merely rotating certain boss and pivot pins mounted on predetermined suspension linkage components.

It is another object of the present invention to provide a pin and boss construction of the type described which permits the adjustment of the distance between axles in a multiple axle suspension apparatus and thereby eliminates the need for tie rods and turnbuckles and the like.

It is another object of the present invention to provide a pin and boss construction of the type described which permits adjustment of the axle alignment of multiple axle suspension apparatus and provides a more positive locking action to maintain the proper alignment between axles as compared to prior methods and means.

It is still another object of the present invention to provide means for adjusting the distance between axles of a multiple axle suspension apparatus which may be adjusted by conventional hand tools and may be manufactured and assembled at lower cost as compared to prior means.

Further objects and advantages of the present invention will be apparent from the following description, reference being had to the accompanying drawings wherein a preferred form of embodiment of the invention is clearly shown.

In the drawings:

FIG. 1 is a broken side elevational view of a trailer that includes a multiple axle suspension system constructed in accordance with the present invention;

FIG. 2 is a rear elevational view of the trailer and multiple axle suspension system shown in FIG. 1;

FIG. 4 is a top elevational view of the linkage of FIG. 3;

FIG. 5 is a rear elevational view of the linkage of FIGS. 3 and 4;

FIG. 6 is a partial sectional view illustrating the novel pin and boss construction of the present invention, the section being taken along line 6—6 in FIG. 3; and FIG. 7 is an enlarged end elevational view of the apparatus shown in FIG. 6.

Figure 3:
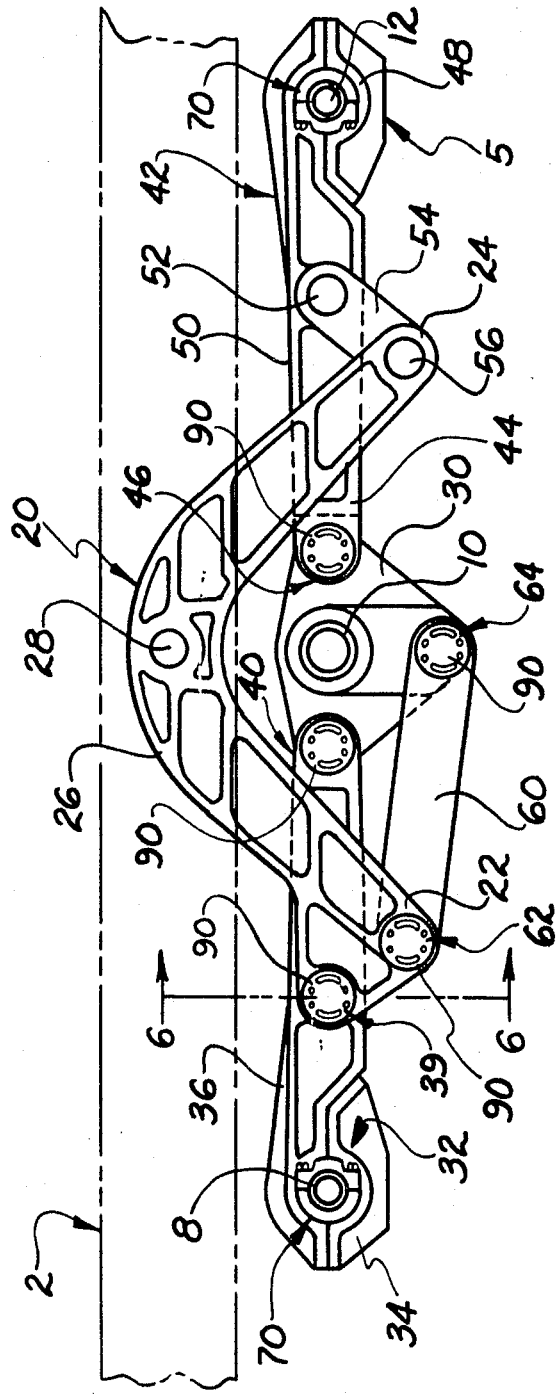
FIG. 3 is a side elevational view of a linkage comprising a portion of the suspension system of the trailer of FIG. 1.

Referring in detail to the drawings, FIGS. 1 and 2 illustrate a trailer type vehicle which includes a trailer frame indicated generally at 2. The front end of the trailer is connected to a towing vehicle 4 by means of a conventional fifth wheel 6.

The trailer frame 2 is supported by right and left suspension linkage apparatus, each of which is indicated generally at 5 in FIG. 2 and each incorporates means for adjusting the axle spacing alignment constructed in accordance with the present invention.

In general, the suspension linkage apparatus shown and described herein illustrates a preferred form and is shown and described in detail in my co-pending application Ser. No. 639,416 filed May 18, 1967. It will be understood that the means for adjusting axle alignment may be used with other forms of multiple axle suspension apparatus without departing from the spirit of the present invention.

Each of the right and left suspension linkages 5 is supported by a respective end of a front axle 8, a center axle 10, and a rear axle 12. Front wheels 14 are mounted on front axle 8, center wheels 16 are mounted on center axle 10, and rear wheels 18 are mounted on rear axle 12. As seen in FIG. 2, two wheels are preferably mounted on each end of the three axles.

Referring specifically to FIGS. 3 and 4, one of the linkages 5 is illustrated in detail and comprises an equalizing beam indicated generally at 20 that includes a front end 22, a rear end 24, and an intermediate portion 26 which is pivotally connected to frame means 2 at a pivot pin 28.

Each suspension linkage further includes a center connector 30 and a front walking beam, indicated generally at 32, that includes a front end 34 and an intermediate portion 36. Intermediate portion 36 includes a pin and boss assembly, indicated generally at 39, which forms a pivotal connection with front portion 22 of equalizing beam 20. Front walking beam 32 also includes a rear end connected to center connector means 30 by another pin and boss assembly indicated generally at 40.

Still referring to FIGS. 3 and 4, the suspension linkage also includes a rear walking beam indicated generally at 42 that includes a front end 44, pivoted to center connector means 30 by another pin and boss assembly indicated generally at 46. Rear walking beam 42 further includes a rear end 48 and an intermediate portion 50 that includes a pivotal connection 52 with one end of a shackle 54, the other end of said shackle being connected to said rear end 24 of said equalizing beam at a pivotal connection 56.

Referring again to FIGS. 3 and 4, a brake reaction torque arm 60 includes a front pivotal connection indicated generally at 62 with front end 22 of the equalizing beam 20 and a rear pivotal connection indicated generally at 64 with the previously mentioned center connector means 30. Pivotal connections 62 and 64 include a pin and boss assembly identical to the assemblies at 39, 40, and 46.

Referring specifically to FIGS. 6 and 7, the pin and boss assembly referred to above and constructed in accordance with the present invention is illustrated in detail and comprises the means for adjusting the alignment between axle 8 and the fifth wheel connection 6 and between axles 8, 10, and 12.

FIG. 6 is a sectional view at pivotal connection 39 and is representative of the pin and boss assemblies indicated generally at 40, 46, 62, and 64 and therefore in the interest of simplicity and brevity, separate views through the above mentioned connections are omitted.

As seen in FIGS. 6 and 7, the pivotal connection of intermediate portion 36 of front walking beam 32 to the front end 22 of equalizing beam 20 comprises a pin 38 extended through a tapered bore 73 in walking beam 32 and surrounded by tapered resilient bushings 74.

A boss 90 is removably and adjustably connected to the front portion 22 of equalizing beam 20 by threaded bolts 94 disposed in threaded holes 96 provided in front end 22.

As seen in FIG. 6, equalizing beam 20 is provided with a pair of bores 98 and 99 eccentric relative to the axis of rotation of the body of pin 38.

Boss 90 is provided with an annular recess or blind hole 100 concentric with bore 73 and rotatably receives the end of the body of pin 38. Boss 90 is adjustably and rotatably mounted in bore 98.

The left end of pin 38 includes a flanged head 92 and an annular offset shoulder portion 106 which is rotatably disposed in bore 99. Shoulder portion 106 is offset with respect to the body portion of pin 38 such that shoulder portion 106 rotates in bore 99 eccentrically with respect to the rotation of the body of pin 38 in recess 100. Flanged head portion 92 is removably and adjustably fastened to beam 22 by threaded fasteners 95 disposed in threaded holes 96.

From the above description it will be understood that upon rotation of boss 90 and pin 38, the centerline of bore 73 and hence the pivot point of walking beam 32 may be adjusted forward or backward as viewed in FIG. 3.

Now referring specifically to FIG. 7, boss 90 is provided with a plurality of openings which include six circular bores 110 and two arcuate slots 112. Bolts 94 are shown disposed in two of the bores 110.

The distance between each bore 110 and between the ends of slots 112 and the adjacent bores are preferably equal, however, any predetermined spacing may be used.

The left end view of the flanged head portion 92 of pin 38 is identical to FIG. 7 and therefore is omitted.

To adjust the centerline to centerline alignment between axles 8, 10, and 12 and between axle 8 and fifth wheel connection 6, one merely removes bolts 94 and 95 and rotates boss 90 and pin 38 to move the pivot point of the end of walking beam 32 forward or backward the desired distance.

The same corresponding procedure is then followed at pin and boss assemblies 40, 46, 62, and 64 to effect a realignment of the centerline distances between the axles.

Of course, the degree of rotation is fixed by the spacing between bores 110 as bores 110 must be aligned with tapped holes 96 before boles 94 may be replaced and tightened to secure the position of pin 38. However, once the arcuate slots 112 are aligned with holes 96, an infinite number of bolt positions are possible such that very small adjustments may be made.

It should be pointed out that the eccentricity between the body of pin 38 and bores 98 and 99 represents one-half of the maximum distance which the pivot point of walking beam 32 may be moved.

It should also be pointed out that the eccentric boss and pin construction described herein provides a more positive locking action when bolts 94 and 95 are securely tightened than other means such as turnbuckles, for example. Further, turnbuckles are more exposed to the elements and tend to rust more quickly and fail.

Also, the inherent play in a turnbuckle is not present in the pin and boss assembly of the present invention which therefore provides a more efficient and accurate adjustment of the axle alignment.

While the form of embodiment of the present invention as herein disclosed constitutes a preferred form, it is to be understood that other forms might be adopted, all coming within the scope of the claims which follow.

I claim:

1. A suspension system for vehicles comprising, in combination, frame means; a plurality of through type axles disposed in tandem arrangement; a right suspension linkage connecting the right ends of said axles to one side of said frame means; and a left suspension linkage connecting the left side of said axles to the left side of said frame means, each of said right and left suspension linkages including a plurality of pivotal connections, certain of said pivotal connections comprising a first linkage component pivotally mounted on a pin means, said pin means being adjustably and rotatably mounted on a second linkage component in eccentric relationship relative to the axis of rotation of said first linkage component about said pin means, said pin means forming a pivotal connection between said first and second suspension members for independent vertical movement of said axles and for varying the longitudinal spacing between the centerlines of said first and second axles.

2. The suspension system defined in claim 1 wherein said first linkage component includes a first bore and said second linkage component includes second and third bores eccentrically aligned relative to said first bore and wherein said pin means includes a pin having a body portion extended through said first bore and an offset head portion rotatably mounted in said second bore, and a boss rotatably mounted in said third bore and provided with an annular recess which receives an end of said body portion; and means for adjustably fastening said pin and boss to said second linkage component.

3. A suspension system for vehicles comprising, in combination, frame means; a plurality of axles disposed in tandem arrangement; a suspension linkage connecting said axles to said frame means and including a first suspension member provided with a first bore; a second suspension member including leg portions extending in adjacent relationship to opposite sides of said first suspension member, each of said leg portions being provided with an eccentric bore that is eccentrically positioned relative to said first bore in said first suspension member; a pin member disposed in said first bore for pivotally mounting said first suspension member, and including an offset shoulder portion rotatably mounted in one of said eccentric bores; a boss member connected to one end of said pin member and including a second offset shoulder portion rotatably mounted in the other of said eccentric bores; and means for adjustably fastening said pin and boss member to said leg portions of said second suspension member.

4. The apparatus defined in claim 3 wherein said boss includes a plurality of openings; and a plurality of threaded fasteners removably mounted in certain of said openings.

5. The apparatus defined in claim 3 wherein said pin member includes a flanged head portion provided with a plurality of openings; and a plurality of threaded fasteners removably mounted in certain of said openings.

6. A suspension system for vehicles comprising, in combination, frame means; a plurality of through type axles disposed in tandem arrangment; a right suspension linkage connecting the right ends of said axles to one side of said frame means; and a left suspension linkage connecting the left side of said axles to the left side of said frame means, each of said right and left suspension linkages including a forwardly extending walking beam, a rearwardly extending walking beam, and a center connector for confronting ends of said two walking beams; and adjustable pivotal connections between the confronting ends of said walking beams and said center connection, each including a pin rotatably mounting said walking beams to said center connector and a boss receiving one end of said pin, said pin and said boss being rotatably mounted in said center connector eccentrically with respect to the rotation of said walking beams.

7. A multiple axle suspension system for vehicles comprising, in combination, frame means; an equalizing beam including a front end, a rear end, and an intermediate portion pivotally connected to said frame means; center connector means; a front walking beam including a front end, an intermediate portion including a pivotal walking beam connection with said front portion of said equalizing beam, and a rear end pivoted to said center connector means; a rear walking beam including a front end pivoted to said center connector means, an intermediate portion, and a rear end; means forming a second pivotal walking beam connection between said rear end of said equalizing beam and said intermediate portion of said rear walking beam; a front axle mounted on said front end of said front walking beam; a center axle mounted on said center connector means; a rear axle mounted on said rear end of said rear walking beam; and wheels on said axles, certain of said pivotal connections including eccentrically adjustable pin means for varying the location of the axis of rotation of a respective pivoted member.

8. A suspension system for vehicles comprising frame means; a plurality of axles disposed in tandem arrangement and provided with wheels for movably supporting said frame means; load equalizing linkage means including a plurality of pivotally connected suspension members mounting said frame means on said axles for substantially equally distributing the load to said plurality of axles, said linkage means including a first suspension member mounted for pivotal movement with respect to said frame means and including a first axle mounting portion for a first axle; a second suspension member mounted for pivotal movement with respect to said frame means and including a second axle mounting portion for a second axle; and eccentrically adjustable pin means forming a pivotal connection between said first and second suspension members for independent vertical movement of said axles and for varying the longitudinal spacing between the centerlines of said first and second axles.

References Cited

UNITED STATES PATENTS 3,357,661    12/1967    Aakjar.
2,889,868    6/1959    Seenberg _____ 267—57.1 X PHILIP GOODMAN, Primary Examiner U.S. Cl. X.R.

267—57.1